United States Patent

Lieben et al.

[11] Patent Number: 6,081,730
[45] Date of Patent: Jun. 27, 2000

[54] COMMUNICATIONS DEVICE

[75] Inventors: Jan Lieben, VW Wintersyk, Netherlands; Matthias Jobst, Bochum, Germany

[73] Assignee: Nokia Mobile Phones Limited, Espoo, Finland

[21] Appl. No.: 08/961,288

[22] Filed: Oct. 30, 1997

[30]       Foreign Application Priority Data

Oct. 31, 1996 [DE] Germany .......................... 196 44 104

[51] Int. Cl.⁷ .................................................. H04B 1/38
[52] U.S. Cl. .......................... 455/557; 455/556; 455/563; 455/418
[58] Field of Search .................................... 455/418, 419, 455/420, 556, 557, 558, 564, 575, 563, 573, 31.2, 417; 379/357, 355, 356

[56]            References Cited

U.S. PATENT DOCUMENTS

| 5,166,973 | 11/1992 | Hoff ......................................... 379/357 |
| 5,197,092 | 3/1993 | Bamburak .............................. 455/31.2 |
| 5,276,729 | 1/1994 | Higuchi et al. .......................... 455/564 |
| 5,384,834 | 1/1995 | Sato et al. ................................ 379/357 |
| 5,479,476 | 12/1995 | Finke-Anlauff ............................ 379/58 |
| 5,487,108 | 1/1996 | Atkins et al. ............................. 455/419 |
| 5,657,371 | 8/1997 | Suomi et al. ............................. 455/418 |
| 5,754,625 | 5/1998 | Shimura .................................. 455/573 |
| 5,812,946 | 9/1998 | Nakabayashi et al. ................. 455/418 |
| 5,857,157 | 1/1999 | Shindo .................................... 455/556 |
| 5,884,103 | 3/1999 | Terho et al. ............................. 455/418 |
| 5,911,121 | 6/1999 | Andrews ................................. 455/418 |

FOREIGN PATENT DOCUMENTS

| 3608497 A1 | 9/1987 | Germany . |
| 3819538 C3 | 1/1989 | Germany . |
| 3932686 A1 | 4/1990 | Germany . |

*Primary Examiner*—Dwayne D. Bost
*Assistant Examiner*—Quochien B. Vuong
*Attorney, Agent, or Firm*—Perman & Green, LLP

[57]            ABSTRACT

A communications device according to the invention comprises a telephone set (7), which has a first control device (9) and a main data memory (8) for storing first data, and at least one data input unit (1) which can be connected to the telephone set (7) and has a second control device (3) and an auxiliary data memory (2) for storing second data which represent a part of the first data and via which the first data can be accessed. Both control devices (9, 3) are designed such that, in the event of a data change in one of the data memories, they allow a corresponding change to be made to the data assigned to them in the other data memory.

7 Claims, 3 Drawing Sheets

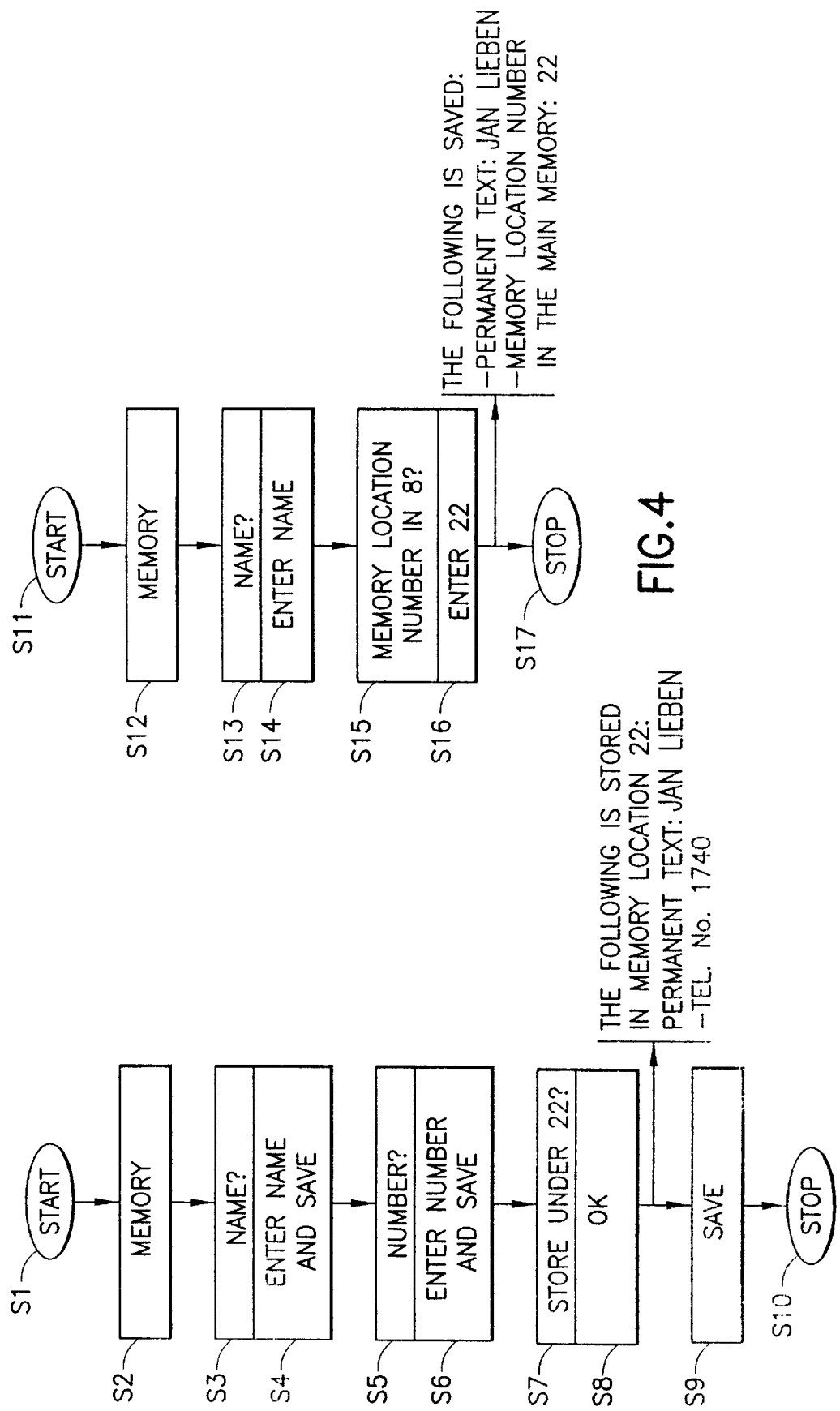

COMMUNICATIONS DEVICE

The invention relates to a communications device according to the subject matter of Patent claim 1.

A communications device is already known which comprises a telephone set with an integrated voice dialling device. However, the latter cannot be mechanically separated from the telephone set, resulting in a problem for mobile use of this communications device. Since the voice dialling device and telephone set are accommodated in one housing, only an abbreviated dialling memory is used, in addition, in which a name is stored with the associated telephone number at in each case one predetermined memory location address in order to call the associated telephone number and to initiate a dialling process when a name is entered acoustically into the voice dialling device.

Furthermore, it is already known for a telephone set to be connected, for example via a cable, to a communications unit in order to form a communications device. Said communications unit may be a printer via which data received from the telephone set can be printed out. The data memory in the printer cannot, however, be used as an abbreviated dialling memory for carrying out a dialling process.

The invention is based on the object of providing a further communications device which offers more flexible useage options for a telephone that is part of it, with low memory administration complexity at the same time.

A communications device according to the invention comprises a telephone set, which has a control device and a main data memory for storing first data, and at least one data input unit which can be connected to the telephone set and has a second control device and an auxiliary data memory for storing second data which represent a part of the first data, via which second data it is possible to access the first data.

The communications device according to the invention thus offers the capability, if the telephone set has a data input device connected to it, of controlling said telephone set via the data input device in order to initiate a dialling process and to make a telephone call. In this case, a telephone number is sought in the main data memory of the telephone set via the auxiliary data memory, which is used as an abbreviated dialling memory. The telephone number itself does not need to be stored in the auxiliary data memory, which means simpler data administration.

On the other hand, the telephone set can alternatively be separated from the data input unit. The telephone set can then be used in a conventional manner. If this is a mobile telephone, then it can be carried by the user, while the data input unit remains at its original location.

The data input unit may be a voice dialling unit for acoustically inputting information, an optical scanning unit for optically inputting information, or an electronic interface, for example an ISDN interface. The optical scanning unit may operate, for example, using infrared radiation.

In the case of the acoustic voice dialling unit for acoustically inputting information, this unit may, for example, be permanently installed in a motor vehicle. If the driver connects his mobile telephone to the voice dialling unit installed in the motor vehicle, then he can operate the mobile telephone via the voice dialling unit. If he leaves the vehicle, he just takes the mobile telephone with him and can thus still be communicated with.

According to a very advantageous development of the invention, the control unit of the telephone set and the control unit of the data input unit are designed such that, in the event of a data change in one of the data memories (main data memory or auxiliary data memory), they allow a corresponding change to be made to the data assigned to them in the other data memory.

This achieves a very major simplification for data administration, since, in the event of a data change in one of the data memories, the data contents in the other data memory are automatically updated or matched.

To provide the greatest possible flexibility for the user, the main data memory in the telephone is used as a master memory, and the auxiliary data memory in the data input unit is used as a slave memory. The telephone set is then provided with means for inputting commands relating to a change to the first data stored in the main data memory.

According to yet another advantageous refinement of the invention, comparison means are provided, to be precise for comparing data to be changed in one of the data memories with data assigned to them in the other data memory, before a data change. This ensures in a particular manner that only data associated with one another in the main data memory and the auxiliary data memory can ever be changed. The comparison means are preferably located in the telephone set.

According to yet another advantageous refinement of the invention, the respective data in the main data memory are assigned an identifier for a data input unit which can be connected to the telephone set. This ensures that data in the main data memory, some of which are also located in the auxiliary data memory of the data input unit, can only ever be changed when the data input unit is also actually connected to the telephone set. The data input unit can report the connection state to the telephone set, or this information is requested by the telephone set. In any case, if required, the user can use an identifier in the main data memory.

It should also be mentioned that, of course, a plurality of different data input units can also be connected to the telephone set at the same time. In this case, what has been said above applies as appropriate to each of these data input units.

The contents of the main data memory and the auxiliary data memory can be entered separately when the system is brought into use. The respective memory location numbers in the main data memory would then in each case contain the name and telephone number of a subscriber and, possibly, the identifier mentioned above. The name of the subscriber and the respectively associated memory location number in the main data memory must then be entered in the auxiliary data memory. This can all be done manually. However, the data in the auxiliary data memory can also be programmed automatically, if, once the main data memory has been programmed, they are read from it and transferred to the auxiliary data memory. This allows data administration to be simplified even further.

The invention will be explained in more detail in the following text with reference to the drawing, in which:

FIG. 3 shows a flowchart to explain the inputting of data into the main data memory of the telphone set;

FIG. 4 shows a flowchart to explain the inputting of data into the auxiliary data memory of the voice dialling unit connected to the telephone set;

Figure 1:
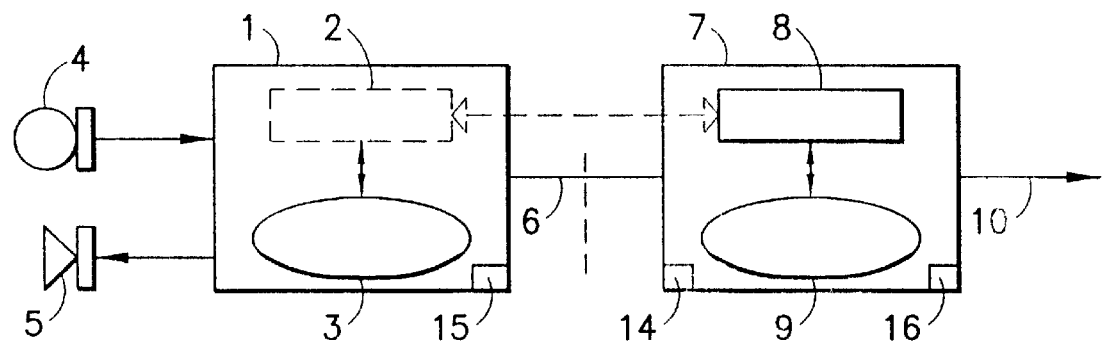
FIG. 1 shows a communications device having a voice dialling unit as the data input unit, and a telephone set which is connected to the voice dialling unit.

FIG. 1 shows an exemplary embodiment of a communications device according to the invention. It contains a voice dialling unit 1 in which an abbreviated dialling memory 2 and a control device 3 are located, said control device 3 having access to the abbreviated dialling memory 2. The voice dialling unit 1 furthermore has an microphone 4 for acoustically inputting information, and a loudspeaker 5 for acoustically outputting information. The inputting and outputting of information via the microphone 4 and the loudspeaker 5 are controlled by the control device 3, which also saves information in the abbreviated dialling memory 2 and reads information from this abbreviated dialling memory 2. The abbreviated dialling memory 2 is in this case called the auxiliary data memory.

The voice dialling unit 1 is connected to a mobile telephone 7 via a cable 6. The mobile telephone 7 is configured in the normal manner and contains a main data memory 8 as well as a control device 9, said control device 9 having access to the main data memory 8. The reference number 10 designates an antenna of the mobile telephone 7.

The voice dialling unit 1 may be permanently installed, for example, in a motor vehicle. In this case, it may have a holder to hold the mobile telephone 7, which can then be connected to the voice dialling unit 1 via the cable 6. Instead of the cable 6, a plug device can also be used to make a contact between the voice dialling unit 1 and the mobile telephone 7.

In the abbreviated dialling memory 2, or auxiliary data memory, of the voice dialling unit 1, the name of a subscriber and the associated memory location address in the main data memory 8 (in which the name of the subscriber likewise appears) are in each case stored in a respective memory address. In contrast, the main data memory 8 of the mobile telephone 7 contains, in a respective memory location address, the name of a subscriber, the telephone number of this subscriber and, possibly, an associated identifier of the type of data input unit connected to the mobile telephone 7, in this case an identifier for the voice dialling unit 1.

The following table shows the allocation of memory locations in the auxiliary data memory 2 and the main data memory 8. In this case, SW indicates the identifier of the voice dialling unit 1:

| Auxiliary data memory 2 Identifier: SW | | Main data memory 8 | | | |
| --- | --- | --- | --- | --- | --- |
| Name | Memory location number in the main data memory | Memory location number in the main data memory | Name | Tel. No. | Identifier |
| Rolf Meier | 1 | 1 | Rolf Meier | 2110 | SW |
| Inge Fuchs | | 2 | Inge Fuchs | 2980 | SW |
| . | . | . | . | . | . |
| . | . | . | . | . | . |
| Jan Lieben | 22 | 22 | Jan Lieben | 1740 | SW |
| . | . | . | . | . | . |
| . | . | . | . | . | . |

-continued

| Auxiliary data memory 2 Identifier: SW | | Main data memory 8 | | | |
| --- | --- | --- | --- | --- | --- |
| Name | Memory location number in the main data memory | Memory location number in the main data memory | Name | Tel. No. | Identifier |
| Heniz Schmidt | 50 | 50 | Heinz Schmidt | 6056 | SW |

Figure 2:
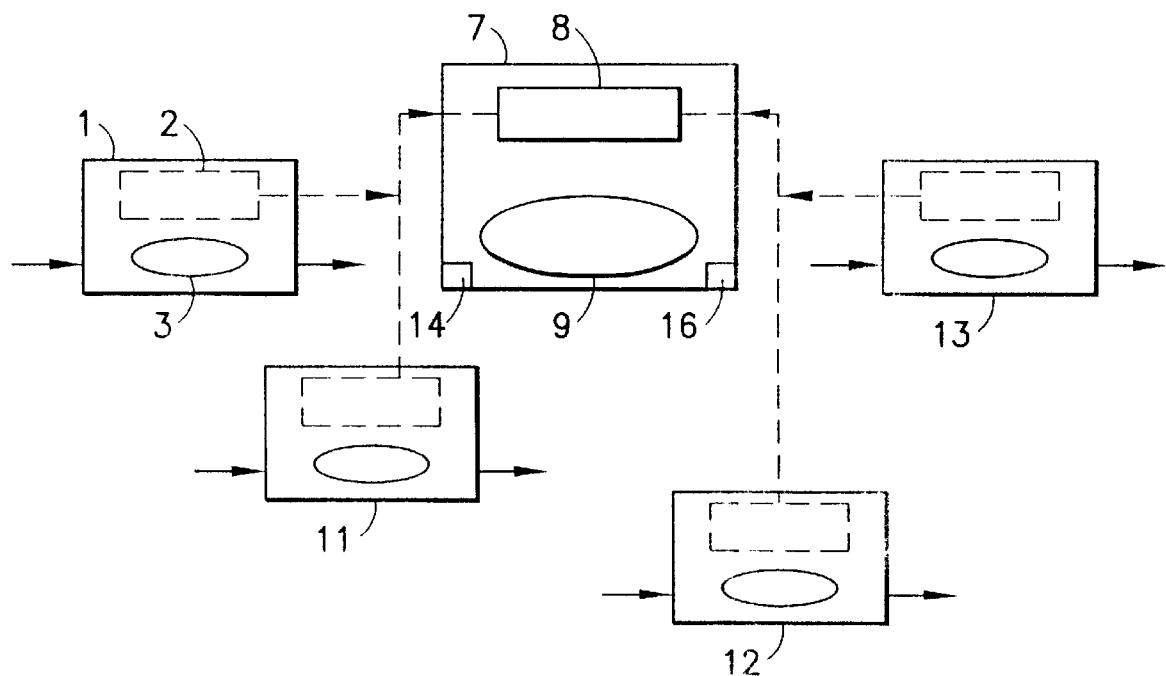
FIG. 2 shows a communications device having a telephone set and a plurality of different data input units connected to it.

FIG. 2 shows an extension of the communications device according to FIG. 1, identical parts being provided with the same reference symbols. As can be seen, the mobile telephone 7 can in this case be connected to a plurality of different data input units 3, 11, 12 and 13. This data input unit 11 may be an infrared system for optical scanning of, for example, names which are then saved in the abbreviated dialling memory of this unit, as is also the case with the voice dialling unit 1. The data input unit 12 can, in a corresponding manner, be designed as an ISDN interface in order to allow, for example, names to be written to its abbreviated dialling memory by electronic means. The data unit 13 may be any other suitable unit. It is possible in this case to connect all the data input units 3, 11, 12 and 13 to the mobile telephone 7 at the same time. In this case, the data input units 3, 11, 12 and 13 are then located at the same point. Another variant is for the data input units in 3, 11, 12 and 13 each to be connected to the mobile telephone 7 at different times, it then being possible for the data input units 3, 11, 12 and 13 to be located at different points.

In this case, the memory contents of the abbreviated dialling memories in the data input units 3, 11, 12 and 13, on the one hand, and the data contents of the main data memory 8 in the mobile telephone 7, on the other hand, can be organized in a similar manner to that stated in the above table. However, each data input unit then has a different identifier.

The following text describes in more detail, with reference to FIG. 3, how data are saved in the main memory 8 of the mobile telephone 7. Thus, first of all, only the mobile telephone 7 is operated, assuming that the name "Jan Lieben", with the associated telephone number, is to be stored in memory location number 22 in the main data memory 8. After starting the mobile telephone 7 in step S1, the MEMORY key is first of all pressed on the keypad 14 of the mobile telephone 7, to be precise in step S2. The statement "Name" then appears on the display of the mobile telephone 7 in step S3, meaning that the mobile telephone 7 is now asking for the name which is to be saved to be entered. The name "Jan Lieben" is entered in the following step S4 by operating the keypad 14 of the mobile telephone 7, and is subsequently saved by operating a save key. After this, the statement "Number" appears on the display of the mobile telephone 7 in step S5, meaning that the mobile telephone 7 is now asking for the telephone number of the previously saved subscriber to be entered. The telephone number is then entered and saved in step S6 by operating the keypad 14 of the mobile telephone 7. The number of Jan Lieben is 1740 in the present case. In step S7, a question is asked via the display of the mobile telephone 7 as to whether the previously entered name of the subscriber and his telephone number are to be stored in a specific memory location number in the main data memory 8. Suitable memory location numbers can either be called up manually, or they can be changed cyclically whenever the program in the flowchart in FIG. 3 is run through. Thus, in the present case, a question is asked via the display of the mobile telephone 7 as to whether the previously entered data should be saved in memory location number 22. If yes, a confirmation key OK on the keypad 14 is pressed in step S8. In the next step S9, the data are saved in the main data memory 8, and the program ends in step S10.

After program step S8, the following data are thus stored in the main data memory 8 of the main telephone 7 in memory location number 22: Jan Lieben (as permanent text) and 1740 as the associated telephone number. By carrying out further steps between steps S9 and S10 it is also possible to enter manually a corresponding identifier for each memory location number in the main data memory 8, this identifier characterizing the data input unit which will later be connected to the mobile telephone 7. Thus, in the present case, the identifier SW would be entered, that is to say the identifier for the voice dialling unit 1.

It is now intended to describe, with reference to the flowchart in FIG. 4, how the name "Jan Lieben" and that memory location number in the main data memory 8 of the mobile telephone 7 at which the name Jan Lieben appears in the main data memory 8 are stored in the abbreviated dialling memory 2 of the voice dialling unit 1. Only the voice dialling unit 1 is operated to do this.

After the voice dialling unit 1 has been started in step S11, the user initially guides himself to the save program in the menu structure of the voice dialling unit 1. This is done in step S12. In the next step S13, the voice dialling unit 1 asks acoustically, via its loudspeaker 5, for the name of the subscriber (Jan Lieben) to be stored. In step S14, the user then enters the name asked for acoustically, via the microphone 4. After this, the voice dialling unit 1 asks, in step S15, for the memory location number in the main data memory 8 of the mobile telephone 7 in which the previously entered name (Jan Lieben) is stored. If the user no longer knows this memory lcoation number, then he can question the mobile telephone 7 in an appropriate manner for this purpose, for example by searching for the name "Jan Lieben" in the mobile telephone and reading out the associated memory location number. This memory location number (22) is then entered, in the next step S16, either likewise acoustically or by appropriate key operation on a keypad 15 that is part of the voice dialling unit 1. The entry is then saved. After this, the program ends in step S17.

Thus, after step S16, the following information is stored in the auxiliary data memory 2 of the voice dialling unit 1: the name "Jan Lieben" together with the memory location number 22 associated with him and in which this name is also stored in the main data memory 8 of the mobile telephone 7.

It should be mentioned that the save process in the voice dialling unit 1 can be carried out even when it is not connected to the mobile telephone 7. If, on the other hand, the voice dialling unit 1 is connected to the mobile telephone 7 and information is written to the voice dialling unit 1 in accordance with the flowchart according to FIG. 4, then, after acoustically inputting the name "Jan Lieben" in step S14 and after identification of this name, this name can also be called up from the main data memory 8 of the mobile telephone 7, and can be transmitted to the voice dialling unit 1. To carry out this process, the information in memory location number 22 in the main data memory 8 must be ready to be called up when the name is entered in the voice dialling unit 1.

Figure 5:
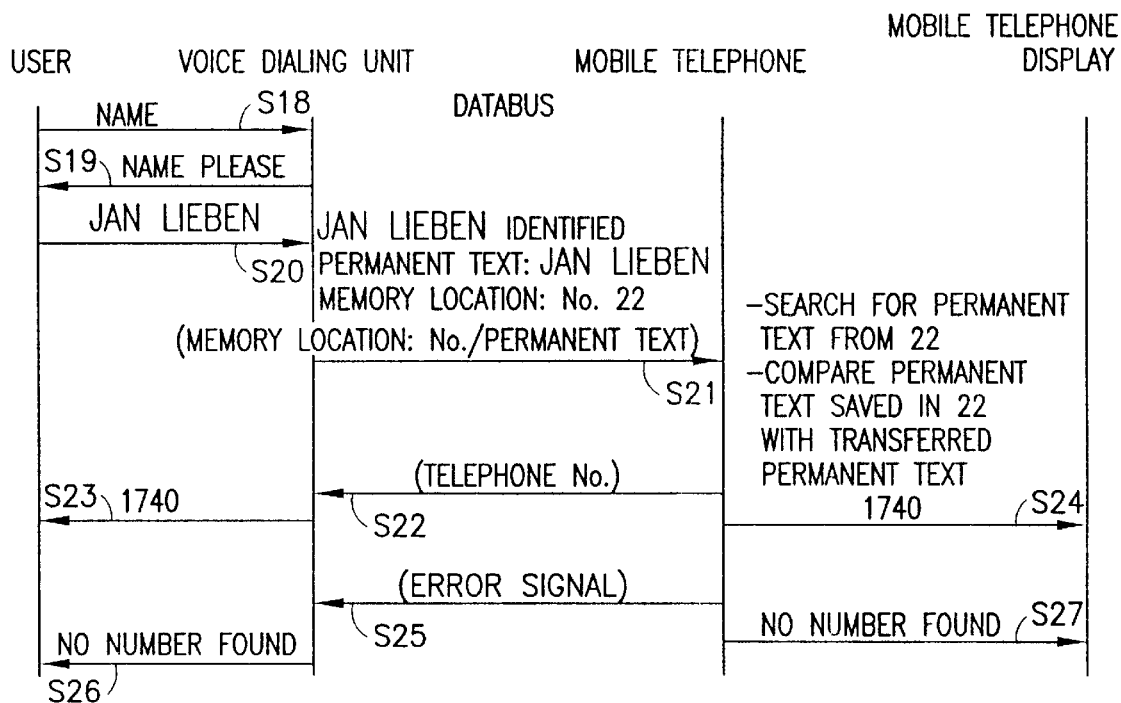
FIG. 5 shows a signal sequence diagram of a dialling process via the voice dialling unit.

The communication process between the voice dialling unit 1 and the mobile telephone 7 will be explained in detail in the following text with reference to FIG. 5, the two devices being connected to one another. To be more precise, this relates to a dialling process.

In step S18, the user acoustically inputs the command "Name" into the voice dialling unit 1 via the microphone 4. Then, in step S19, the voice dialling unit 1 acoustically outputs the response "Name please" via the loudspeaker 5 to the user. Then, in step S20, the user acoustically inputs the name "Jan Lieben" via the microphone 4. The voice dialling unit 1 now identifies the name Jan Lieben and searches for the permanent text "Jan Lieben" associated with it in the auxiliary data memory 2. After finding this permanent text "Jan Lieben", it also knows the memory location number (22) associated with it, in which this name is stored in the main data memory 8.

In step S21, the voice dialling unit 1 transmits the memory location number and the permanent text, via the databus, to the mobile telephone 7. The mobile telephone 7 now searches the transmitted memory location number (22) for the permanent text (Jan Lieben) stored in the main data memory 8 and compares this with the corresponding permanent text (Jan Lieben) which was transmitted to it from the voice dialling unit 1 in step S21.

If the two permanent texts match, then, in step S22 it transmits Jan Lieben's telephone number (1740) associated with the permanent text, via the databus, to the voice dialling unit 1 which then, in step S23 outputs this number, for example acoustically via the loudspeaker 5. At the same time, the telephone number is also displayed on the display of the mobile telephone 7 in step S24.

If, in contrast, the text transmitted from the voice dialling unit 1 in step S21 does not match the permanent text sought by the mobile telephone 7, then, in step S25, an error signal is sent via the databus to the voice dialling unit 1, which gives the user an appropriate acoustic output via the loudspeaker 5, for example "no number found". In step S27, a corresponding output is made to the display of the mobile telephone 7.

It should also be mentioned that the databus is the protocol between the mobile telephone and an external device connected to it, in order to interchange signalling messages.

As already mentioned initially, the communications device according to the invention has the capability, when changes are made to the data stored in the main data memory 8 of the mobile telephone 7, to make corresponding changes, automatically, to the associated data in the auxiliary data memory 2. This will be explained in the following text with reference to FIG. 6.

In step S28, a user enters either a delete command or an edit command into the mobile telephone via appropriate command input keys 16 on the mobile telephone 7. With the delete command, the name "Jan Lieben" to be deleted is entered, in order to delete this name in the main data memory 8. With the edit command, the name "Jan Lieben" is entered, which, for example, is to be stored in a new memory location number in the main data memory 8, as well as the new memory location number.

After receipt of the command in step S28, the mobile telephone 7 confirms that the name "Jan Lieben" is stored in memory location number 22, that this memory location number is assigned the identifier SW and, furthermore, that the voice dialling unit 1 is connected to the mobile telephone 7. In this case, the delete and edit commands can be carried out. If it is found that no voice dialling unit is connected to the mobile telephone 7, the delete and edit commands can be ignored. Alternatively, when the user is at home, he can nevertheless carry out the deletion process or the edit process in the main data memory 8 whenever he wants to.

For the case described above, where the voice dialling unit 1 is connected to the mobile telephone 7, the program goes to step S29 after step S28. If the delete command had been input before this, then the (delete (memory location number, permanent text)) command is now transmitted, in step S29, via the databus to the voice dialling unit 1. The memory location number 22 and the permanent text "Jan Lieben" are thus transmitted. If, on the other hand, the edit command was input in step S28, then the (edit (old memory location number, new memory location number, permanent text)) command is now transmitted, in step S29, via the databus to the voice dialling unit 1. Thus, the old memory location number 22, the new memory location number in which the name "Jan Lieben" is to be stored and the permanent text "Jan Lieben" are transmitted in this situation.

After receiving the corresponding command in S29, the voice dialling unit 1 in the auxiliary data memory 2 searches for the memory location number 22 in the main data memory 8 and reads the associated permanent text "Jan Lieben" from the auxiliary data memory 2. This permanent text which has been read from the auxiliary data memory 2 is then compared with the permanent text obtained in step S29. If a match is found, then, in step S30, a command is transmitted from the voice dialling unit 1 via the databus to the mobile telephone 7 by means of which, in the case of the delete command, the mobile telephone 7 now deletes the name "Jan Lieben" and the associated telephone number in the main data memory 8. With regard to this deletion process, a confirmation signal is transmitted in the next step S31 from the mobile telephone 7 to the voice dialling unit 1, at which point the voice dialling unit 1 deletes the name "Jan Lieben" and the memory location number associated with it in the auxiliary data memory 2. This deletion process is indicated to the mobile telephone 7 by a further confirmation signal, in step S32, from the voice dialling unit 1 to said mobile telephone 7, so that, in the following step S33, the latter indicates to the user via its display that the name has been deleted.

In the case of the edit command, after receiving the corresponding command in step S29, the permanent texts are once again compared. If the permanent texts are found to match, an edit command signal is transmitted, in step S30, from the voice dialling unit 1 to the mobile telephone 7 so that, in the main data memory 8 of the mobile telephone 7, the permanent text "Jan Lieben" and the the associated telephone number are transferred to the previously entered new memory location address. In step S31, a corresponding confirmation signal is passed to the voice dialling unit 1, which then likewise transfers the name "Jan Lieben" from the old memory location address to the new one in the main data memory 8. In other words, the new memory location address in the main data memory 8 is assigned to the main "Jan Lieben" in the auxiliary data memory 2. A corresponding confirmation signal is transmitted, in step S32, from the voice dialling unit 1 to the mobile telephone 7, which then indicates to the user, in step S33, via the display that the change has been made.

Figure 6:
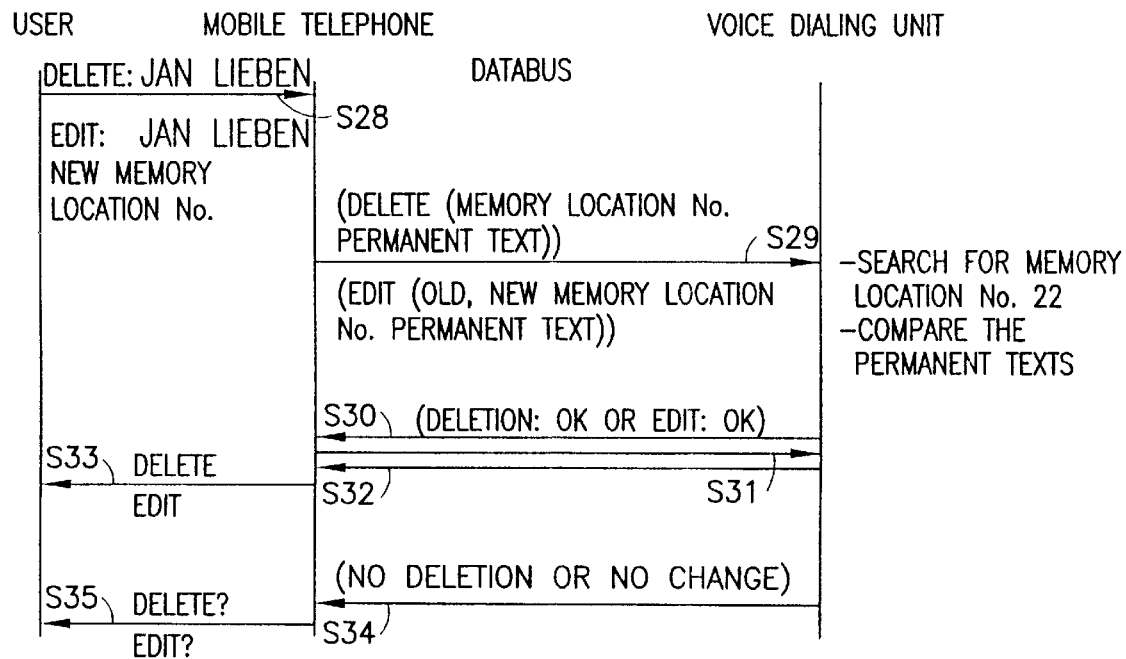
FIG. 6 shows a signal sequence diagram for editing data in the main memory of the telephone set and for an associated change to data in the auxiliary memory of the voice dialling unit connected to the telephone set.

It should be mentioned that communication between the mobile telephone 7 and the voice dialling unit 1, in the case of the delete command or the edit command, can also be carried out in a manner other than that indicated in FIG. 6. The important factor is that deletion or editing of a memory location allocation in the main data memory 8 is also carried out in a corresponding manner in the auxiliary data memory 2.

If, after step S29 in FIG. 6, no match is found between the permanent texts to be compared, then the voice dialling unit 1 reports this to the mobile telephone 7 in step S34. Depending on the operating mode, a deletion or editing process can then be terminated or blocked, or the mobile telephone 7 allows the user to decide whether he nevertheless does or does not wish to carry out the deletion or change. This is indicated to him via the display, in step S35.

A number of important advantages of the communications device according to the invention are mentioned once again below:

Changes in the main data memory 8, for example deletions or regrouping of already stored information with a move to other memory location numbers, can also be carried out automatically in the auxiliary data memory 2, so that the administration of both memories is relatively simple.

The administration is also simplified by the fact that only abbreviated dialling information need be stored in the auxiliary data memory 2. It is unnecessary to store the entire telephone number of the subscriber here as well. This is read from the main data memory 8.

When new names are to be added to the main data memory 8, these are input there manually. A corresponding manual input can also be carried out in the auxiliary data memory 2. Alternatively, however, when a new name with the associated telephone number is read to the main data memory 8, the newly entered name and the memory location number accommodating it can also automatically be read out and transmitted to the auxiliary data memory 2. There is thus no need for any manual data input to the auxiliary data memory 2.

The data contents of the main data memory 8 of the mobile telephone 7 can, of course, be edited even when the mobile telephone 7 not connected to the voice dialling unit 1. If any data records with which the identifier of the voice dialling unit 1 is associated are then affected by the data change, then the user can decide whether the change should or should not be carried out. If required, the change option can also be blocked in order to avoid any mismatch between the data in the main data memory 8 and the data in the auxiliary data memory 2. If, on the other hand, the identifier of a connected data input unit 1 matches the identifiers of the data to be edited in the main data memory 8, then the data changes are carried out immediately.

What is claimed is:

1. A Communications device for facilitating the dialing of telephone number data comprising:

a telephone set, having a first control device and a main data memory, said main memory having first data stored therein accessible through said first control device, said first data including a listing of telephone numbers and related data; and at least one data input unit connected to the telephone set for communication therewith said at least one data input unit further comprising:

a second control device; and an auxiliary data memory said auxiliary data memory having second data stored therein accessible through said second control device, said second data including an abbreviated version of said first data by which said first data is identifiable through said second data; and wherein said first and second control devices cooperate to provide access to said first data through use of said at least one data input unit.

2. Communications device according to claim 1, characterized in that both control devices (9, 3) are designed such that, in the event of a data change in one of the data memories, they allow a corresponding change to be made to the data assigned to them in the other data memory.

3. Communications device according to claim 2, characterized by a comparison means for comparing data to be changed in one of the data memories with data assigned to them in the other data memory, before a data change.

4. Communications device according to claim 1, characterized in that the telephone set (7) has means (16) for inputting commands relating to a change to the first data stored in the main data memory (8).

5. Communications device according to claim 1, characterized in that the respective data in the main data memory (8) are assigned an identifier (SW) for a data input unit (1) which can be connected to the telephone set (7).

6. Communications device according to claim 1, characterized in that the telephone set (7) is a mobile telephone.

7. Communications device according to claim 1, characterized in that the data input unit is designed as a voice dialling unit (1), an optical scanning unit (11) or an electronic interface (12).

* * * * *